(12) United States Patent
Tramoni

(10) Patent No.: US 11,671,146 B2
(45) Date of Patent: Jun. 6, 2023

(54) CALIBRATION OF AN ACTIVATION DURATION OF A CIRCUIT

(71) Applicant: STMicroelectronics (Rousset) SAS, Rousset (FR)

(72) Inventor: Alexandre Tramoni, Le Beausset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/499,423

(22) Filed: Oct. 12, 2021

(65) Prior Publication Data

US 2022/0149893 A1 May 12, 2022

(30) Foreign Application Priority Data

Nov. 12, 2020 (FR) ...................................... 2011620

(51) Int. Cl.
*H04B 5/00* (2006.01)
*H04B 17/11* (2015.01)
*H04B 17/21* (2015.01)

(52) U.S. Cl.
CPC ......... *H04B 5/0031* (2013.01); *H04B 5/0037* (2013.01); *H04B 5/0075* (2013.01); *H04B 17/11* (2015.01); *H04B 17/21* (2015.01)

(58) Field of Classification Search
None
See application file for complete search history.

(56) References Cited

U.S. PATENT DOCUMENTS

| 8,796,999 | B2* | 8/2014 | Toncich | H02J 50/12 |
| | | | | 320/155 |
| 8,963,486 | B2* | 2/2015 | Kirby | H02J 50/05 |
| | | | | 320/108 |
| 9,071,926 | B2* | 6/2015 | Krishnan | G06K 7/10237 |
| 9,112,363 | B2* | 8/2015 | Partovi | B60L 53/124 |
| 9,218,518 | B2 | 12/2015 | Kim et al. | |
| 9,425,642 | B2* | 8/2016 | Toncich | H02J 50/12 |
| 9,465,010 | B2* | 10/2016 | Borges | G06Q 10/1097 |
| 9,537,353 | B1* | 1/2017 | Bossetti | H02J 50/10 |
| 9,698,872 | B2* | 7/2017 | Haverinen | H04B 5/0081 |
| 9,819,401 | B2* | 11/2017 | Karandikar | H04B 5/0025 |
| 9,912,567 | B2* | 3/2018 | Huang | H04W 52/0216 |
| 9,998,178 | B2 | 6/2018 | Dedieu et al. | |
| 10,153,809 | B2* | 12/2018 | Zhou | H04B 5/0031 |
| 10,302,468 | B2 | 5/2019 | Brandsma et al. | |
| 10,505,592 | B2 | 12/2019 | Tramoni et al. | |
| 10,594,159 | B2* | 3/2020 | Bossetti | H02J 7/0042 |
| 10,609,643 | B1* | 3/2020 | Le | H04B 5/0031 |
| 10,666,325 | B2* | 5/2020 | Zhou | H01Q 1/248 |
| 10,985,804 | B2* | 4/2021 | Miller | H04W 52/0229 |

(Continued)

FOREIGN PATENT DOCUMENTS

| CN | 103256954 A | 8/2013 |
| CN | 104050432 A | 9/2014 |

(Continued)

*Primary Examiner* — Tuan A Tran
(74) *Attorney, Agent, or Firm* — Slater Matsil, LLP

(57) ABSTRACT

An embodiment of the present description concerns a method wherein a duration of a periodic step of activation of a near-field communication circuit of a first device is calibrated according to a time interval between an activation of the circuit and a reception, by the first device, of a message transmitted by a second device.

24 Claims, 3 Drawing Sheets

(56) References Cited

U.S. PATENT DOCUMENTS

| | | | |
|---|---|---|---|
| 11,157,893 B2* | 10/2021 | Park | ................... G06Q 20/3278 |
| 2010/0201201 A1* | 8/2010 | Mobarhan | ............... H02J 50/50 |
| | | | 320/108 |
| 2016/0248468 A1 | 8/2016 | Greiner et al. | |
| 2019/0000360 A1 | 1/2019 | Cole et al. | |

FOREIGN PATENT DOCUMENTS

| | | |
|---|---|---|
| CN | 105308874 A | 2/2016 |
| CN | 206820749 U | 12/2017 |
| CN | 109905861 A | 6/2019 |

\* cited by examiner

CALIBRATION OF AN ACTIVATION DURATION OF A CIRCUIT

CROSS-REFERENCE TO RELATED APPLICATIONS

This application claims the benefit of French Application No. 2011620, filed on Nov. 12, 2020, which application is hereby incorporated herein by reference.

TECHNICAL FIELD

The present disclosure generally concerns electronic devices and methods. The present disclosure more particularly concerns electronic devices integrating a near-field communication circuit (NFC), more commonly called NFC devices, and near-field charge methods likely to be implemented by such devices.

BACKGROUND

In addition to methods of near-field data exchange between NFC devices, methods of near-field power transfer aiming at charging a NFC device with another NFC device are known. Existing method of near-field charge of a NFC device by another NFC device however turn out having a low performance, their implementation causing, in particular, significant charge durations.

SUMMARY

There is a need to improve existing methods of near-field charge of a NFC device by another NFC device.

An embodiment overcomes all or part of the disadvantages of known methods of near-field charge of a NFC device by another NFC device.

An embodiment provides a method wherein a duration of a periodic step of activation of a near-field communication circuit of a first device is calibrated according to a time interval between an activation of the circuit and a reception, by the first device, of a message transmitted by a second device.

According to an embodiment, the duration of the periodic step of activation of the near-field communication circuit of the first device is calibrated at the beginning of an operation of charge of the first device by the second device.

According to an embodiment, the calibration is performed only once during the operation of charge of the first device by the second device.

According to an embodiment, the message comprises data relative to the charge of the first device by the second device.

According to an embodiment, the data comprise information of power and of duration of charge of the first device by the second device.

According to an embodiment, the duration of the periodic step of activation of the near-field communication circuit of the first device is decreased after the calibration.

According to an embodiment, the duration of the periodic step of activation of the near-field communication circuit of the first device corresponds, before the calibration, to a first number of oscillations, at a substantially constant frequency, of an oscillating circuit of the first device.

According to an embodiment, the duration of the periodic step of activation of the near-field communication circuit of the first device corresponds, after the calibration, to a second number of oscillations of the oscillating circuit of the first device.

According to an embodiment, the duration of the periodic step of activation of the near-field communication circuit of the first device is, before the calibration, set according to an estimate of an inaccuracy of the oscillation frequency of the oscillating circuit.

According to an embodiment, the time interval between the activation of the near-field communication circuit of the first device and the reception of the message transmitted by the second device is measured by counting a third number of oscillations of the oscillating circuit of the first device.

According to an embodiment, the duration of the periodic step of activation of the near-field communication circuit of the first device includes, after the calibration, a margin intended to compensate for a fluctuation of the oscillation frequency of the oscillating circuit of the first device.

According to an embodiment, the oscillation frequency of the oscillating circuit of the first device is in the range from 10 kHz to 500 kHz, preferably in the range from 30 kHz to 300 kHz, more preferably equal to approximately 64 kHz.

An embodiment provides a device configured to implement the method such as described.

BRIEF DESCRIPTION OF THE DRAWINGS

The foregoing and other features and advantages of the present invention will be discussed in detail in the following non-limiting description of specific embodiments and implementation modes in connection with the accompanying drawings, in which.

DETAILED DESCRIPTION OF ILLUSTRATIVE EMBODIMENTS

Figure 1:
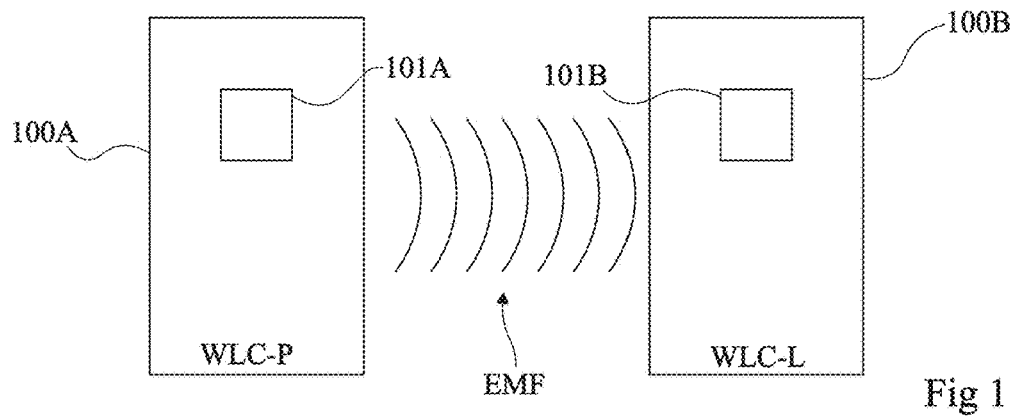
FIG. 1 schematically shows in the form of blocks an example of a near-field communication and charge system of the type to which the described embodiments and implementation modes apply.

Like features have been designated by like references in the various figures. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the generation of the radio frequency signals and the interpretation thereof have not been detailed, the described embodiments and implementation modes being compatible with usual techniques of generation and interpretation of such signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless specified otherwise, the expressions "around", "approximately", "substantially" and "in the order of" signify within 10%, and preferably within 5%.

In the present description, the term NFC device designates an electronic device integrating at least one near-field communication circuit (NFC).

FIG. 1 schematically shows an example of a near-field communication system of the type to which the described embodiments and implementation modes apply.

In the shown example, a first NFC device 100A (WLC-P) is likely to communicate, by near-field electromagnetic coupling, with a second NFC device 100B (WLC-L). According to applications, for a communication, one of NFC devices 100A, 100B operates in so-called reader mode while the other NFC device 100B, 100A operates in so-called card mode, or the two NFC devices 100A and 100B communicate in peer-to-peer mode (P2P).

Each NFC device 100A, 100B integrates, for example, a near-field communication circuit symbolized, in FIG. 1, by a block 101A, 101B. Near-field communication circuits 101A and 101B for example each comprise various elements or electronic circuits for generating or detecting a radio frequency signal by means of an antenna (not shown), for example, modulation or demodulation circuits. During a communication between NFC devices 100A and 100B, the radio frequency signal generated by one of NFC devices 100A, 100B is for example captured by the other NFC device 100B, 100A located within its range.

In the shown example, it is assumed that NFC device 100A emits an electromagnetic field (EMF) to initiate a communication with NFC device 100B. The EMF field is for example captured by second NFC device 100B as soon as it is within its range. A coupling then forms between two oscillating circuits, in the case in point that of the antenna of NFC device 100A and that of the antenna of NFC device 100B. This coupling for example results in a variation of the load formed by the circuits of NFC device 100B on the oscillating circuit for generating the EMF field of NFC device 100A.

For a communication, a corresponding phase or amplitude variation of the emitted field is for example detected by device 100A, which then starts a protocol of NFC communication with device 100B. On the side of NFC device 100A, it is for example detected whether the amplitude of the voltage across the oscillating circuit and/or the phase shift with respect to the signal generated by circuit 101A come out of amplitude and/or phase ranges each delimited by thresholds.

In the case of a communication, once NFC device 100A has detected the presence of NFC device 100B in its field, it starts a procedure for establishing a communication, for example implementing transmissions of requests by NFC device 100A and of responses by NFC device 100B (polling sequence such as defined in the NFC Forum specifications).

Applications for example aim at taking advantage of the EMF field to implement data exchanges between NFC devices 100A and 100B.

Other applications for example rather aim at taking advantage of the EMF field to implement power exchanges between NFC devices 100A and 100B. Generally, this for example corresponds to a case where device 100B has an electric power source (not shown), for example a battery, capable of being charged by NFC device 100A. This for example more particularly corresponds to a case where NFC device 100A is a mobile terminal, for example a cell phone or a touch pad, and where NFC device 100B is a connected object, for example a connected watch, a connected bracelet, a pair of wireless headphones, a digital pen, etc. In this case, NFC device 100A for example has a battery of greater capacity than that of NFC device 100B.

As an example, in the case where NFC device 100A is used to charge NFC device 100B, NFC device 100A is a wireless charging poller (WLC-P) and NFC device 100B is a wireless charging listener (WLC-L). In this case, NFC devices 100A and 100B for example implement a wireless power transfer (WPT) such as defined in the NFC Forum specifications.

More particularly, the power transfer between NFC device 100A and NFC device 100B for example comprises the implementation of a wireless charging control protocol (WLC control protocol) such as defined in the NFC Forum specifications. Among wireless charging control protocols, protocols called static (static WLC control protocol) and protocols called dynamic or negotiated (negotiated WLC control protocol) can in particular be distinguished.

In a case where NFC device 100A implements a protocol of static wireless charge control of NFC device 100B, NFC device 100A for example continuously emits electromagnetic field EMF without transmitting data to NFC device 100B. In this case, NFC device 100A for example only transmits a carrier, of frequency f_EMF equal to approximately 13.56 MHz, with no frequency or amplitude modulation.

In another case where NFC device 100A implements a negotiated protocol of wireless charge control of NFC device 100B, NFC device 100A for example continuously emits electromagnetic field EMF and periodically transmits messages to NFC device 100B. In this case, NFC device 100A for example transmits the carrier, of frequency f_EMF equal to approximately 13.56 MHz, and for example periodically performs a modulation of this carrier to transmit the messages to NFC device 100B. As a response to the messages from NFC device 100A, other messages may be transmitted by NFC device 100B to NFC device 100A.

Generally, the messages transmitted by NFC device 100A to NFC device 100B for example comprise data relative to the charging of NFC device 100B by NFC device 100A. More particularly, these data for example define a capability of wireless charging (WLC_CAP) of NFC device 100B by NFC device 100A. As an example, the data comprise information of power and duration of the charging of NFC device 100B by NFC device 100A. Periodic exchanges of messages between NFC device 100A and NFC device 100B for example enable to regularly verify that NFC device 100B still needs being charged and, if so, to adjust the charging power and duration.

In the following description, it is for example considered that NFC devices 100A and 100B implement a negotiated wireless charging protocol.

Figure 2:
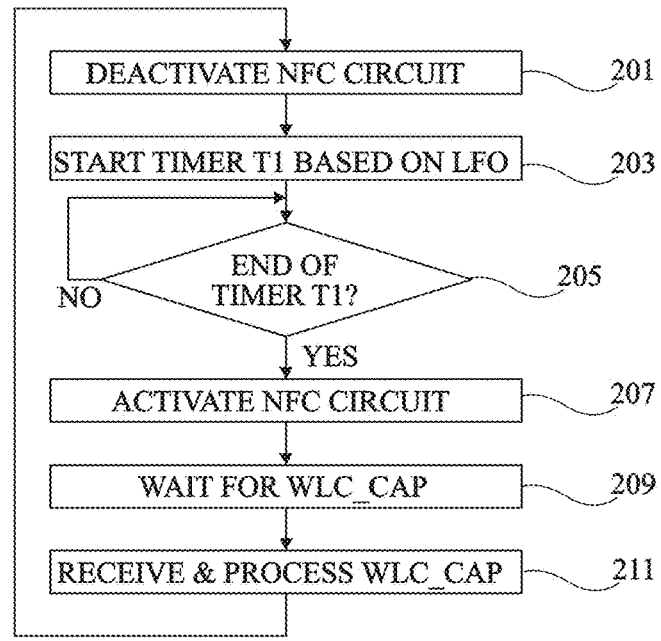
FIG. 2 partially and schematically shows in the form of blocks an example of a method of near-field charge of a device by another device.

FIG. 2 partially and schematically shows in the form of blocks an example of a method of near-field charge of a device, for example, the NFC device 100B of FIG. 1, by another device, for example, the NFC device 100A of FIG. 1.

In the shown example, during an operation of near-field charging of NFC device 100B by NFC device 100A, NFC device 100A periodically transmits messages WLC_CAP to NFC device 100B. To be able to receive and process each message WLC_CAP originating from NFC device 100A, the method provides periodic steps of activation of the near-field communication circuit 101B of NFC device 100B. Each of these periodic steps of activation of circuit 101B, having a duration D_ON, starts before the reception of a message WLC_CAP by NFC device 100B and stops after the processing of message WLC_CAP by NFC device 100B.

Between the periodic steps of activation of the near-field communication circuit 101B of NFC device 100B, the method further provides periodic steps of deactivation of circuit 101B. Each of these periodic steps of deactivation of circuit 101B, having a duration D_OFF, enables to decrease the power consumption of NFC device 100B during the charge. In particular, all or part of nearfield communication circuit 101B may for example be deactivated during duration D_OFF to decrease the electric power consumption of NFC device 100B. Circuits (not shown) for example intended to demodulate the electromagnetic field EMF emitted by NFC device 100A may in particular be deactivated during duration D_OFF.

During the charge of NFC device 100B by NFC device 100A, the near-field communication circuit 101B of NFC device 100B is thus alternately activated during duration D_ON and deactivated during duration D_OFF.

More particularly, at a step 201 (DEACTIVATE NFC CIRCUIT), the near-field communication circuit 101B of NFC device 100B is deactivated.

At another step 203 (START TIMER T1 BASED ON LFO), subsequent to step 201, a timer T1 is started. Timer T1 for example uses an oscillating circuit (not shown), for example, a low-frequency oscillator (LFO) of NFC device 100B. From step 203, it is for example started to count oscillation periods of the oscillating circuit of NFC device 100B.

At still another step 205 (END OF TIMER T1?), subsequent to step 203, it is controlled whether duration D_OFF has elapsed. For this purpose, a number N of oscillations of circuit 101B since the beginning of step 203 is compared with another number N_OFF of oscillations of circuit 101B theoretically corresponding to duration D_OFF. In a case where duration D_OFF has not elapsed (output NO of step 205), it is then continued to count oscillation periods of the oscillating circuit until number N is equal to the number N_OFF corresponding to duration D_OFF. Once number N_OFF has been reached (output YES of step 205), that is, once duration D_OFF has elapsed, it is then proceeded to another step 207.

At step 207 (ACTIVATE NFC CIRCUIT), subsequent to step 205, the near-field communication circuit 101B of NFC device 100B is activated.

At still another step 209 (WAIT FOR WLC_CAP), subsequent to step 207, NFC device 100B waits for the reception of a message transmitted by NFC device 100A. At step 209, circuit 101B is for example ready to receive a message WLC_CAP from NFC device 100A.

At still another step 211 (RECEIVE & PROCESS WLC_CAP), subsequent to step 209, NFC device 100B receives and then processes the message WLC_CAP transmitted by NFC device 100A.

As an example, steps 201 to 211 are for example repeated until NFC device 100B has been totally charged by NFC device 100A. In particular, at each repetition of step 211, NFC device 100A verifies that NFC device 100B is still present and still need being charged, and then adjusts the charging duration and power.

Figure 3:
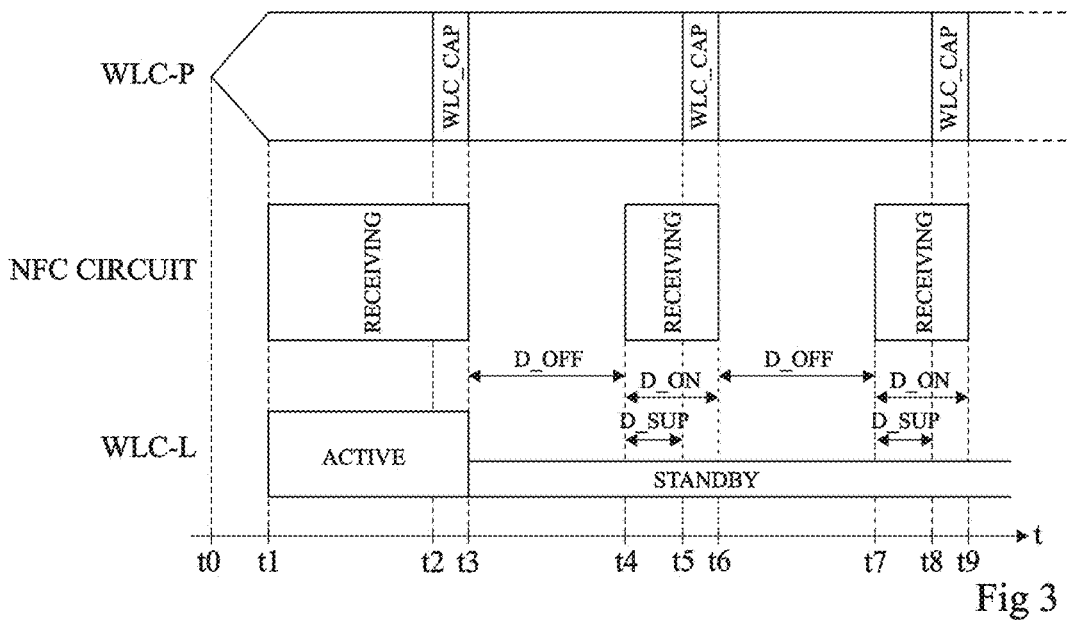
FIG. 3 is a timing diagram illustrating an example of application of the near-field charge method of FIG. 2 to the system of FIG. 1.

FIG. 3 is a timing diagram illustrating an example of application of the near-field charging method of FIG. 2 to the system of FIG. 1.

At a time t0, for example marking the beginning of an operation of charge of NFC device 100B (WLC-L) by NFC device 100A (WLC-P), NFC device 100A starts the emission of electromagnetic field EMF.

At a time t1, subsequent to time t0 and for example corresponding to a time when field EMF reaches a nominal value, the near-field communication circuit 101B (NFC CIRCUIT) of NFC device 100B is activated (RECEIVING). At time t1, NFC device 100B is for example in an active state (ACTIVE), for example, a state where a microprocessor (not shown) of NFC device 100B is powered on.

At a time t2, subsequent to time t1, NFC device 100A starts the transmission of a first message (WLC_CAP). Near-field communication circuit 101B being activated, NFC device 100B receives and then processes the first message WLC_CAP.

At a time t3, subsequent to time t2, the processing of the first message WLC_CAP by NFC device 100B ends. In the shown example, near-field communication circuit 101B is then deactivated, and NFC device 100B is further switched to the low-consumption mode (STANDBY).

At a time t4, subsequent to time t3 and separated from time t3 by duration DOFF, near-field communication circuit loth is reactivated (RECEIVING). In the shown example, NFC device 100B is maintained in the low-consumption mode.

At a time t5, subsequent to time t4, NFC device 100A starts the transmission of a second message (WLC_CAP). Near-field communication circuit 101B being activated, NFC device 100B receives and then processes the second message WLC_CAP.

At a time t6, subsequent to time t5 and separated from time t4 by duration D_ON, the processing of the second message WLC_CAP by NFC device 100B ends. The near-field communication circuit 101B of NFC device 100B is deactivated.

At a time t7, subsequent to time t6 and separated from time t6 by duration D_OFF, near-field communication circuit 101B is reactivated (RECEIVING).

At a time t8, subsequent to time t7, NFC device 100A starts the transmission of a third message (WLC_CAP). Near-field communication circuit 101B being activated, NFC device 100B receives and then processes the third message WLC_CAP.

At a time t9, subsequent to time t8 and separated from time t7 by duration D_ON, the processing of the third message WLC_CAP by NFC device 100B ends. The near-field communication circuit 101B of NFC device 100B is deactivated.

In the example of the method discussed in relation with FIGS. 2 and 3, the duration D_OFF of each step of deactivation of circuit 101B corresponds to the number N_OFF of oscillation periods, at a substantially constant frequency f_LFO, of the oscillating circuit of NFC device 100B. As an example, the oscillation frequency f_LFO of the oscillating circuit of NFC device 100B is in the range from 10 kHz to 500 kHz, preferably in the range from 30 kHz to 300 kHz, more preferably equal to approximately 64 kHz.

To optimize the power efficiency and to decrease the duration of charge of NFC device 100B by NFC device 100A, it is advantageous to ascertain that the time t4, t7 of activation of circuit 101B is as close as possible to the time t5, t8 of transmission of message WLC_CAP by NFC device 100A.

However, the oscillating circuit used to activate circuit 101B at the end of duration D_OFF generally exhibits a frequency inaccuracy. The inaccuracy of the oscillating circuit is for example due to manufacturing dispersions of this circuit. As an example, this inaccuracy is at most in the order of ±15% of the theoretical frequency of the oscillating circuit, that is, of the frequency f_LFO at which the circuit has been designed to operate.

As an example, if the real frequency of the oscillating circuit is smaller than its theoretical frequency f_LFO, the number N_OFF of oscillations then corresponds to a duration greater than duration D_OFF. However, if the real frequency of the oscillating circuit is greater than its theoretical frequency f_LFO, the number N_OFF of oscillations then corresponds to a duration smaller than duration D_OFF.

To avoid risking activating circuit 101B too late, that is, after the beginning of the transmission of one of messages WLC_CAP, circuit 101B is parameterized by taking into account, for example, an unfavorable case where the oscillating circuit would have a frequency inaccuracy of +15%. In the shown example, this leads to providing, between times t4 and t5 and between times t7 and t8, an additional duration or time interval D_SUP enabling to ensure that circuit loth will be activated to receive messages WLC_CAP despite the inaccuracy of the oscillating circuit. Duration D_SUP for example corresponds to a number N_SUP of oscillations of the oscillating circuit. However, the activation of circuit loth during each duration D_SUP has the disadvantage of causing an unwanted power consumption adversely affecting the efficiency and the duration of the charge of NFC device 100B.

To overcome this problem, an oscillating circuit having a lower frequency inaccuracy, for example, in the order of ±1%, could be used. However, this would have the disadvantage of causing a cost increase of the NFC device 100B integrating the oscillating circuit.

Figure 4:
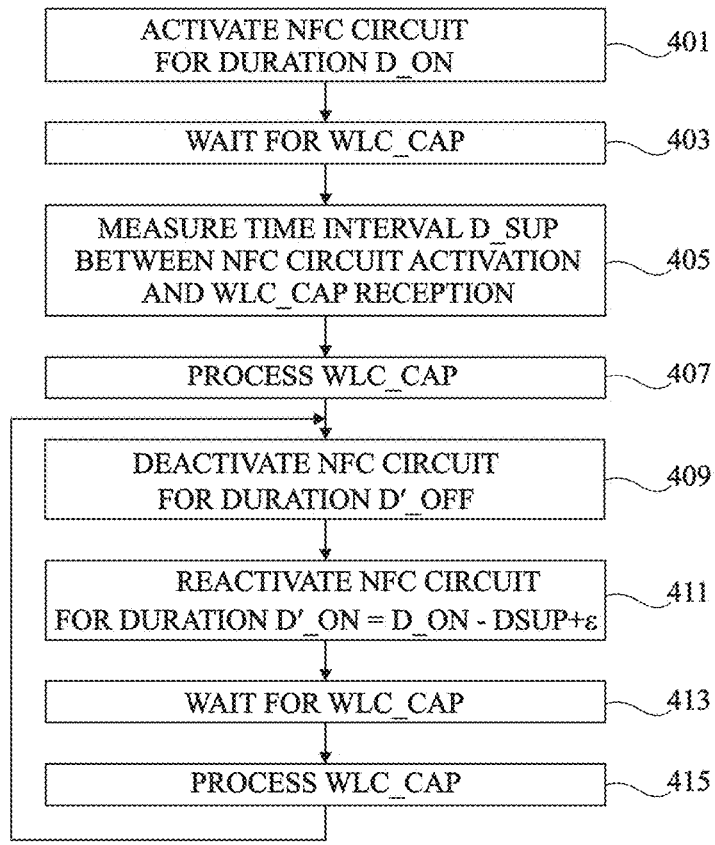
FIG. 4 partially and schematically shows in the form of blocks an implementation mode of a method of near-field charge of a device by another device.

FIG. 4 partially and schematically shows in the form of blocks an implementation mode of a method of near-field charging of a device, for example, the NFC device 100B of FIG. 1, by another device, for example, the NFC device 100A of FIG. 1.

According to this embodiment, the duration D_ON of the periodic step of activation of the near-field communication circuit 101B of NFC device 100B is calibrated according to the time interval D_SUP between a first activation of the circuit, or initial activation, and a reception, by NFC device 100B, of a message WLC_CAP transmitted by NFC device 100A. The calibration is for example performed only once during the operation of charge of NFC device 100B by NFC device 100A.

More particularly, at a step 401 (ACTIVATE NFC CIRCUIT FOR DURATION D_ON), the near-field communication circuit 101B of NFC device 100B is activated during duration D_ON.

At another step 403 (WAIT FOR WLC_CAP), subsequent to step 401, NFC device 100B waits for the reception of a message WLC_CAP transmitted by NFC device 100A. At step 403, circuit 101B is for example ready to receive a message WLC_CAP from NFC device 100A.

At still another step 405 (MEASURE TIME INTERVAL D_SUP BETWEEN NFC CIRCUIT ACTIVATION AND WLC_CAP RECEPTION), subsequent to step 403, NFC device 100B receives the message WLC_CAP transmitted by NFC device 100A. Further, at step 405, the time interval D_SUP separating the activation of circuit at step 401 from the reception of message WLC_CAP is estimated. The estimation of time interval D_SUP is for example performed by counting a number N_SUP of oscillations of the oscillating circuit of NFC device 100B between the activation of circuit at step 401 and the reception of message WLC_CAP.

At still another step 407 (PROCESS WLC_CAP), subsequent to step 405, NFC device 100B processes the message WLC_CAP transmitted by NFC device 100A.

At still another step 409 (DEACTIVATE NFC CIRCUIT FOR DURATION D'_OFF), subsequent to step 407, the near-field communication circuit 101B of NFC device 100B is deactivated during a duration D'_OFF, greater than duration D_OFF. Duration D'_OFF is for example smaller than or equal to the sum of duration D_OFF and of time interval D_SUP.

At still another step 411 (REACTIVATE NFC CIRCUIT FOR DURATION D'_ON=D_ON−D_SUP+ε), subsequent to step 409, the near-field communication circuit 101B of NFC device 100B is reactivated during a duration D'_ON, smaller than duration D_ON. Duration D'_ON is for example greater than or equal to the difference between duration D_ON and time interval D_SUP. This amounts to calibrating the duration of the periodic step of activation of circuit 101B according to the measurement of the frequency inaccuracy f_LFO of the oscillating circuit.

At the end of step 411, that is, after the calibration, the duration D'_ON of the periodic step of activation of the near-field communication circuit 101B of NFC device 100B includes, after the calibration, a duration margin ε intended to compensate for a fluctuation of the oscillation frequency of the oscillating circuit of NFC device 100B. As an example, the fluctuation of the oscillating frequency is due to temperature variations during the operation of charge of NFC device 100B by NFC device 100A.

At still another step 413 (WAIT FOR WLC_CAP), subsequent to step 411, NFC device 100B waits for the reception of another message transmitted by NFC device 100A. At step 413, circuit 101B is for example ready to receive another message WLC_CAP from NFC device 100A.

At still another step 415 (PROCESS WLC_CAP), subsequent to step 413, NFC device 100B processes the message WLC_CAP transmitted by NFC device 100A. Once message WLC_CAP has been processed, circuit 101B is deactivated, for example by returning to step 409.

As an example, steps 409 to 415 are for example repeated until NFC device 100B has been totally charged by NFC device 100A. In particular, at each repetition of step 415, NFC device 100A verifies that NFC device 100B is still present and still need being charged, and then adjusts the charging duration and power.

According to this implementation mode, duration D_ON of the periodic step of activation of the near-field communication circuit 101B of NFC device 100B is calibrated at the beginning of the operation of charge of NFC device 100B by NFC device 100A. Once this calibration has been performed, the duration D'_ON of the periodic step of activation of circuit 101B for example remains unchanged.

As an example, NFC device 100B comprises a non-volatile storage memory (not shown) comprising program code instructions enabling to implement the method discussed hereabove in relation with FIG. 4 when these instructions are executed by a processor (not shown) of NFC device 100B.

Figure 5:
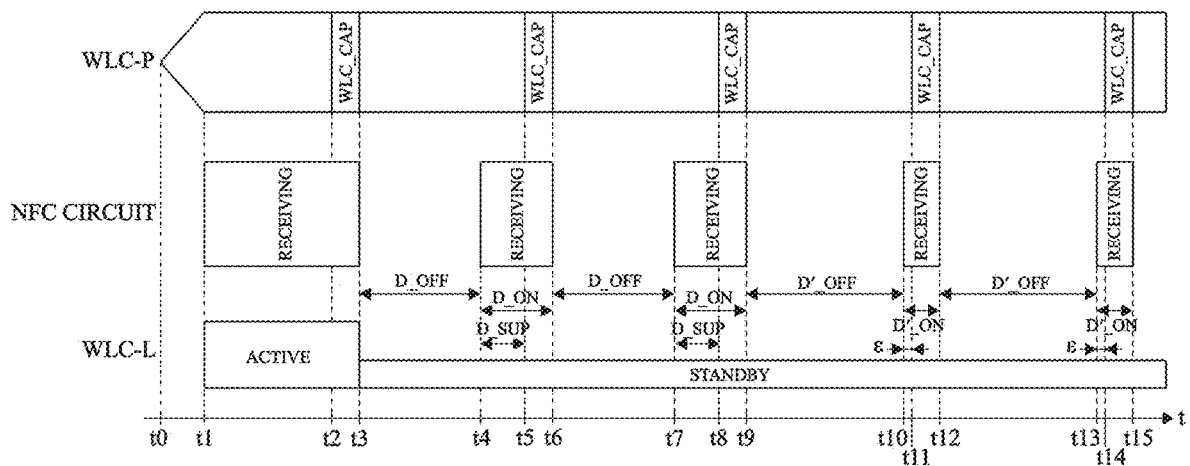
FIG. 5 is a timing diagram illustrating an example of application of the near-field charge method of FIG. 4 to the system of FIG. 1.

FIG. 5 is a timing diagram illustrating an example of application of the near-field charging method of FIG. 4 to the system of FIG. 1.

At a time t0, for example marking the beginning of an operation of charge of NFC device 100B (WLC-L) by NFC device 100A (WLC-P), NFC device 100A starts the emission of electromagnetic field EMF.

At a time t1, subsequent to time t0 and for example corresponding to a time when field EMF reaches a nominal value, the near-field communication circuit 101B (NFC CIRCUIT) of NFC device 100B is activated (RECEIVING). At time t1, NFC device 100B is for example in an active state (ACTIVE), for example, a state where a microprocessor of NFC device 100B is powered on.

At a time t2, subsequent to time t1, NFC device 100A starts the transmission of a first message (WLC_CAP). Near-field communication circuit 101B being activated, NFC device 100B receives and then processes the first message WLC_CAP.

At a time t3, subsequent to time t2, the processing of the first message WLC_CAP by NFC device 100B ends. In the shown example, near-field communication circuit 101B is then deactivated, and NFC device 100B is further switched to the low-consumption mode (STANDBY).

At a time t4, subsequent to time t3 and separated from time t3 by duration D_OFF, near-field communication circuit 101B is reactivated (RECEIVING). In the shown example, NFC device 100B is maintained in the low-consumption mode.

At a time t5, subsequent to time t4 and separated from time t4 by duration D_SUP, NFC device 100A starts the transmission of a second message (WLC_CAP). In the shown example, duration D_SUP corresponds to a duration for which circuit 101B is waiting for the reception of the second message WLC_CAP. Near-field communication circuit 101B being activated at time t5, NFC device 100B receives and then processes the second message WLC_CAP.

At a time t6, subsequent to time t5 and separated from time t4 by duration D_ON, the processing of the second message WLC_CAP by NFC device 100B ends. In the shown example, duration D_ON corresponds to the sum of duration D_SUP and of a duration of reception and processing of the second message WLC_CAP. Duration D_ON of the periodic step of activation of circuit 101B before the calibration for example corresponds to a number N_ON of oscillations of the oscillating circuit of NFC device 100B. At the end of the processing of second message WLC_CAP, the near-field communication circuit 101B of NFC device 100B is deactivated.

At a time t7, subsequent to time t6 and separated from time t6 by duration D_OFF, near-field communication circuit 101B is reactivated (RECEIVING).

At a time t8, subsequent to time t7 and separated from time t7 by duration D_SUP, NFC device 100A starts the transmission of a third message (WLC_CAP). Near-field communication circuit 101B being activated, NFC device 100B receives and then processes the third message WLC_CAP.

At a time t9, subsequent to time t8 and separated from time t7 by duration D_ON, the processing of the third message WLC_CAP by NFC device 100B ends. The near-field communication circuit 101B of NFC device 100B is deactivated.

At a time t10, subsequent to time t9 and separated from time t9 by duration DOFF' circuit 101B is reactivated (RECEIVING). Duration D'_OFF is here greater than duration D_OFF. In the shown example, duration D'_OFF more particularly corresponds to the sum of durations D_OFF and D_SUP minus duration c.

At a time t11, subsequent to time t10 and separated from time t10 by duration ε, NFC device 100A starts the transmission of a fourth message (WLC_CAP). Near-field communication circuit 101B being activated, NFC device 100B receives and then processes the fourth message WLC_CAP.

At a time t12, subsequent to time t11 and separated from time t10 by duration D'_ON, the processing of the fourth message WLC_CAP by NFC device 100B ends. The near-field communication circuit 101B of NFC device 100B is deactivated. The duration D'_ON of the periodic step of activation of circuit 101B after the calibration for example corresponds to another number N'_ON of oscillations of the oscillating circuit of NFC device 100B. Number N'_ON is in this case smaller than the number N_ON of oscillations corresponding to duration D_ON before the calibration.

At a time t13, subsequent to time t12 and separated from time t12 by duration D'_OFF, circuit 101B is reactivated (RECEIVING).

At a time t14, subsequent to time t13 and separated from time t13 by duration ε, NFC device 100A starts the transmission of a fifth message (WLC_CAP). Near-field communication circuit 101B being activated, NFC device 100B receives and then processes the fifth message WLC_CAP.

At a time t15, subsequent to time t14 and separated from time t13 by duration D'_ON, the processing of the fifth message WLC_CAP by NFC device 100B ends. The near-field communication circuit 101B of NFC device 100B is deactivated.

In the shown example, the near-field communication circuit 101B of NFC device 100B is activated just before the reception of each message WLC_CAP. More particularly, after the calibration, time t10, t13 of activation of circuit 101B is separated from time t11, t14 of reception of message WLC_CAP by a duration ε smaller than duration D_SUP. The duration for which circuit 101B is activated is thus decreased, by passing from duration D_ON before the calibration to duration D'_ON after the calibration, and the duration for which circuit 101B is deactivated is thus increased, by passing from duration D_OFF before the calibration to duration D'_OFF after the calibration.

An advantage of the method discussed hereabove in relation with FIGS. 4 and 5 lies in the fact that the calibration enables to decrease the power consumption of NFC device 100B during the charging operation. Such a consumption decrease is all the more significant as the duration separating two successive messages WLC_CAP is long.

Figure 6:
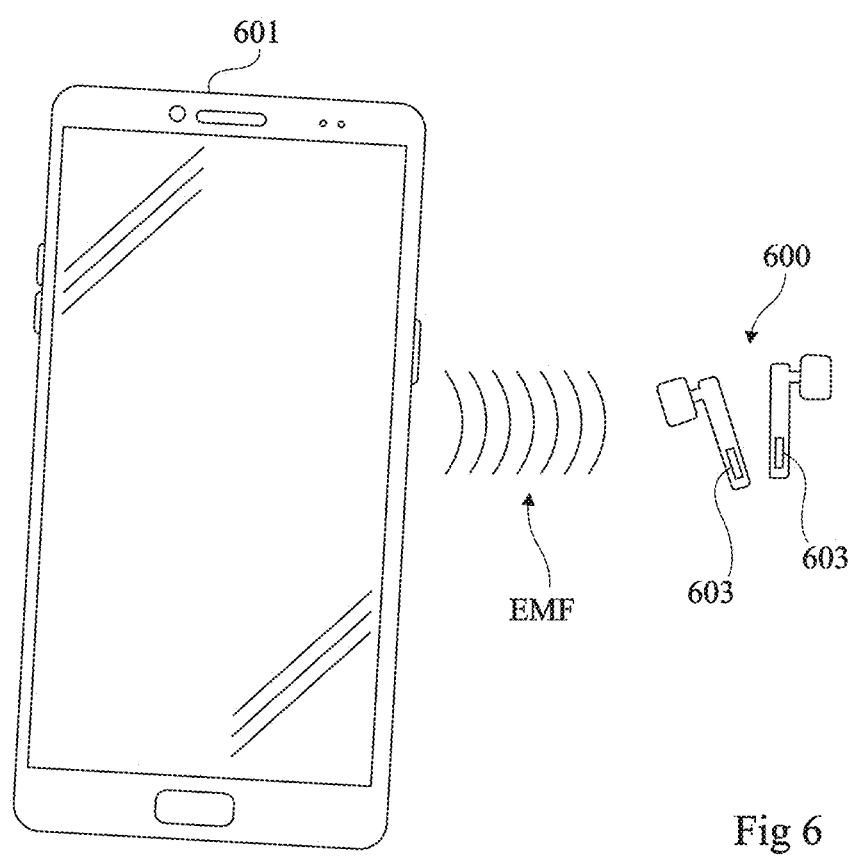
FIG. 6 shows an example of application of the described embodiments and implementation modes to a charge of a connected object by a cell phone.

FIG. 6 shows an example of application of the described embodiments and implementation modes to a charging of a connected object 600 by a cell phone 601. In the shown example, connected object 600 is a pair of wireless headphones.

The implementation of the method described hereabove in relation with FIGS. 4 and 5 particularly enables to optimize the power efficiency of the wireless charge, by cell phone 601, of batteries 603 embedded in wireless headphones 600. More particularly, the implementation of this method for example enables to decrease the time of charging of batteries 603 via electromagnetic field EMF.

Various embodiments, implementation modes, and variants have been described. Those skilled in the art will understand that certain features of these various embodiments, implementation modes, and variants, may be combined and other variants will occur to those skilled in the art. In particular, although examples of application where messages WLC_CAP are transmitted at constant intervals by NFC device 100A, it will be within the abilities of those skilled in the art to adapt the described implementation modes to a case where messages WLC_CAP are transmitted at non-constant intervals.

Finally, the practical implementation of the described embodiments, implementation modes, and variants is within the abilities of those skilled in the art based on the functional indications given hereabove. In particular, the adjustment of duration ε enabling to compensate for the frequency fluctuation of the oscillating circuit is within the abilities of those skilled in the art.

What is claimed is:

1. A method of operating a first device, the method comprising:
   calibrating a duration of a periodic step of activation of a near-field communication circuit of the first device according to
      a time interval between an activation of the near-field communication circuit and a reception, by the first device, of a message transmitted by a second device, and
      a duration margin.

2. The method according to claim 1, further comprising decreasing the duration of the periodic step of activation of the near-field communication circuit of the first device after the calibration.

3. The method according to claim 1, wherein the duration of the periodic step of activation of the near-field communication circuit of the first device corresponds, before the calibration, to a first number of oscillations, at a substantially constant oscillation frequency, of an oscillating circuit of the first device.

4. The method according to claim 3, wherein the duration of the periodic step of activation of the near-field communication circuit of the first device corresponds, after the calibration, to a second number of oscillations of the oscillating circuit of the first device.

5. The method according to claim 3, wherein the duration of the periodic step of activation of the near-field communication circuit of the first device is, before the calibration, fixed according to an estimate of an inaccuracy of the oscillation frequency of the oscillating circuit.

6. The method according to claim 3, further comprising measuring the time interval between the activation of the near-field communication circuit of the first device and the reception of the message transmitted by the second device by counting a third number of oscillations of the oscillating circuit of the first device.

7. The method according to claim 3, wherein the duration margin compensates for a fluctuation of the oscillation frequency of the oscillating circuit of the first device.

8. The method according to claim 3, wherein the oscillation frequency of the oscillating circuit of the first device is in a range from 10 kHz to 500 kHz.

9. A method of operating a first device, the method comprising:
   calibrating a duration of a periodic step of activation of a near-field communication circuit of the first device according to
      a time interval between an activation of the near-field communication circuit and a reception, by the first device, of a message transmitted by a second device, and
      a duration margin, wherein the calibrating comprises performing the calibrating at a beginning of an operation of charging of the first device by the second device.

10. The method according to claim 9, further comprising performing the calibration only once during the operation of charging of the first device by the second device.

11. The method according to claim 9, wherein the message comprises data relative to the charging of the first device by the second device.

12. The method according to claim 11, wherein the data comprise information of power and duration of the charging of the first device by the second device.

13. A first device comprising:
   a near-field communication circuit; and
   a processor configured to calibrate a duration of a periodic step of activation of the near-field communication circuit according to
      a time interval between an activation of the near-field communication circuit and a reception, by the first device, of a message transmitted by a second device, and
      a duration margin.

14. The first device according to claim 13, wherein the processor is configured to calibrate the duration of the periodic step of activation of the near-field communication circuit of the first device at a beginning of an operation of charging of the first device by the second device.

15. The first device according to claim 14, wherein the processor is configured to perform the calibration only once during the operation of charging of the first device by the second device.

16. The first device according to claim 14, wherein the message comprises data relative to the charging of the first device by the second device.

17. The first device according to claim 16, wherein the data comprise information of power and duration of the charging of the first device by the second device.

18. The first device according to claim 13, wherein the processor is configured to decrease the duration of the periodic step of activation of the near-field communication circuit of the first device after the calibration.

19. The first device according to claim 13, wherein the first device further comprises an oscillating circuit, and wherein the duration of the periodic step of activation of the near-field communication circuit of the first device corresponds, before the calibration, to a first number of oscillations, at a substantially constant oscillation frequency, of the oscillating circuit.

20. The first device according to claim 19, wherein the duration of the periodic step of activation of the near-field communication circuit of the first device corresponds, after the calibration, to a second number of oscillations of the oscillating circuit.

21. The first device according to claim 19, wherein the duration of the periodic step of activation of the near-field communication circuit of the first device is, before the calibration, fixed according to an estimate of an inaccuracy of the oscillation frequency of the oscillating circuit.

22. The first device according to claim 19, wherein the processor is configured to measure the time interval between the activation of the near-field communication circuit of the first device and the reception of the message transmitted by the second device by counting a third number of oscillations of the oscillating circuit.

23. The first device according to claim 19, wherein the duration margin compensates for a fluctuation of the oscillation frequency of the oscillating circuit.

24. The first device according to claim 19, wherein the oscillation frequency of the oscillating circuit of the first device is in a range from 10 kHz to 500 kHz.

* * * * *